United States Patent

Zonka

[19]

[11] Patent Number: 5,975,559

[45] Date of Patent: *Nov. 2, 1999

[54] URBAN AND ALL-TERRAIN STROLLER

[76] Inventor: Marco Zonka, 221 S. Sullivan Rd., Apt. 25, Veradale, Wash. 99037-9786

[ * ] Notice: This patent is subject to a terminal disclaimer.

[21] Appl. No.: 08/951,152

[22] Filed: Oct. 15, 1997

Related U.S. Application Data

[63] Continuation of application No. 08/307,060, Sep. 16, 1994, Pat. No. 5,683,096.

[51] Int. Cl.⁶ ........................................................ B62B 1/00
[52] U.S. Cl. ............................................. 280/650; 280/642
[58] Field of Search .................................... 280/642, 644, 280/650, 658, 62

[56] References Cited

U.S. PATENT DOCUMENTS

| | | | |
|---|---|---|---|
| 861,203 | 7/1907 | Bull | 280/642 |
| 4,953,880 | 9/1990 | Sudakoff et al. | 280/47.38 |
| 5,029,891 | 7/1991 | Jacobs | 280/650 |
| 5,076,599 | 12/1991 | Lockett et al. | 280/204 |
| 5,123,670 | 6/1992 | Chen | 280/650 |
| 5,176,395 | 1/1993 | Garforth-Bles | 280/415.1 |
| 5,188,389 | 2/1993 | Baechler | 280/650 |
| 5,224,720 | 7/1993 | Chaw et al. | 280/62 |
| 5,299,825 | 4/1994 | Smith | 280/642 X |
| 5,356,171 | 10/1994 | Schmidlin et al. | 280/642 X |
| 5,421,603 | 6/1995 | Wills et al. | 280/642 |
| 5,468,009 | 11/1995 | Eyman et al. | 280/650 |
| 5,499,831 | 3/1996 | Worth et al. | 280/30 |

Primary Examiner—Christopher P. Schwartz
Assistant Examiner—Melanie Talavera
Attorney, Agent, or Firm—Wells, St. John, Roberts, Gregory & Matkin, P.S.

[57] ABSTRACT

An all-purpose/all-terrain tripodal stroller suitable for urban and rural or recreational and fitness related activities, including street strolling and shopping, or jogging and off-road hiking and strolling. An improved stroller chassis design with high ground clearance yet low center of gravity, maximizing collapsibility yet minimizing total size of vehicle envelope. When folding, the improved chassis allows the front wheel to pivot rearward until in alignment with both rear wheels, while the variable height steering handle folds down around central wheel. All pivot points engaged while collapsing are cantilevered out of plane with support members, which minimizes all scissoring and pinching actions between all framing members.

2 Claims, 5 Drawing Sheets

URBAN AND ALL-TERRAIN STROLLER

RELATED APPLICATION

This application is a continuing application based on currently pending U.S. patent application, Ser. No. 08/307,060, filed on Sept. 16, 1994 now U.S. Pat. No. 5,683,096, issued Nov. 4,1997.

FIELD OF THE INVENTION

The present invention relates to foldable strollers.

BACKGROUND OF THE INVENTION

Over the last few years, several 3-wheeled strollers have entered the market claiming various "all-terrain" features and/or recreational and fitness related capabilities.

All of these designs benefit from the inherent stability of tripodal wheeled contact points over variable terrain. But several salient structural limitations common to all of them limits the quality and versatility of their performance.

The numerous modes of use that modern stroller designs attempt to satisfy have branched into several specialized areas of usefulness. Two primary fields of use are: Street or "urban" use, with an emphasis on light, compact and collapsible design; and "rural" or recreational and fitness/jogging/all-terrain use, with an emphasis on larger wheels and tripodal wheel configurations, to mitigate the effects of uneven or unpaved ground.

The present invention incorporates many of the super light and compact folding features of traditional "urban" stroller and buggy designs, with the durable and mobility enhancing advantages of the so-called "jogging" or "all-terrain" strollers, which are more suitable in suburban and rural environments, into a single unitary design. This Urban and All-Terrain Stroller not only brings these fields of use together, but also substantially improves vehicle performance in both it's urban/street and recreational/rural modes.

U.S. Pat. Nos. 4,953,880 (Sudakoff), 5,029,891 (Jacobs), 5,123,670 (Chen), 5,176,395 (Garforth-Bles), 5,224,720 (Chaw), 5,076,599 (Lockett), and 5,188,389 (Baechler), all embody three-wheeled strollers. All have chassis designs with similar support frameworks that define a rigid triangular or T-shaped structural "plane," parallel to the ground, the height or ground clearance of which is generally determined by the height of the wheel axis above the ground. They also have a solid axle, in the above-stated plane, along the axis generally defined by the two rear wheels.

These common features share distinct limitations: 1) the chassis' ground clearance is limited by the height of the wheel axis, necessitating a larger wheel to provide adequate ground clearance; 2) the total center of gravity of a seated child is moved upward, because all cross supports and framing must occur above the defining plane determined by the height of the wheel axis (necessitating a larger vehicle envelope, and a longer and/or broader "foot-print" of contact points with the ground, to achieve desired stability), and; 3) a solid, uninterrupted structural element or "axle" between the two rear wheels precludes the possibility of having all three wheels, in a collapsed mode, aligned along a single axis, which is most desirable for both maximal collapsing performance, and ease of mobility, transport and storage while stroller is collapsed.

While attempting to comprehensively address the very specific and narrow design considerations related to recreational, fitness, and "all-terrain" stroller use, these strollers actually do so in a way that limits their utility to their own specialty design niche, precluding practical use in all-purpose and/or urban applications. These strollers all incorporate similar design short-comings, with minor changes, evidencing a failure to embark on a comprehensive design revision and functional solution.

It has long been recognized that accidental collapse, and the scissoring and pinching action associated with collapsing strollers, are two of the most injury and liability prone aspects of all stroller designs, but very little has been done to comprehensively address these significant flaws.

Further, most strollers that can provide both upright and reclined seat positions do so in a way that necessitates moving the load center of gravity outward, usually toward the rear, increasingly moving the load weight away from the vehicle's and vehicle load's center of gravity. In the preferred embodiment of the present vehicle, the reclined position is achieved by shifting the child's weight slightly forward and down, increasing the vehicle and vehicle load stability by moving the weight further inside the vehicle envelope, and farther within the "footprint" of the three wheels.

Accordingly, several objects and advantages of the present invention specifically address the broad failures of preexisting three-wheel designs while incorporating numerous other functional advantages that will become apparent from the following description of a preferred embodiment.

LIST OF REFERENCE NUMERALS

Figure 1:
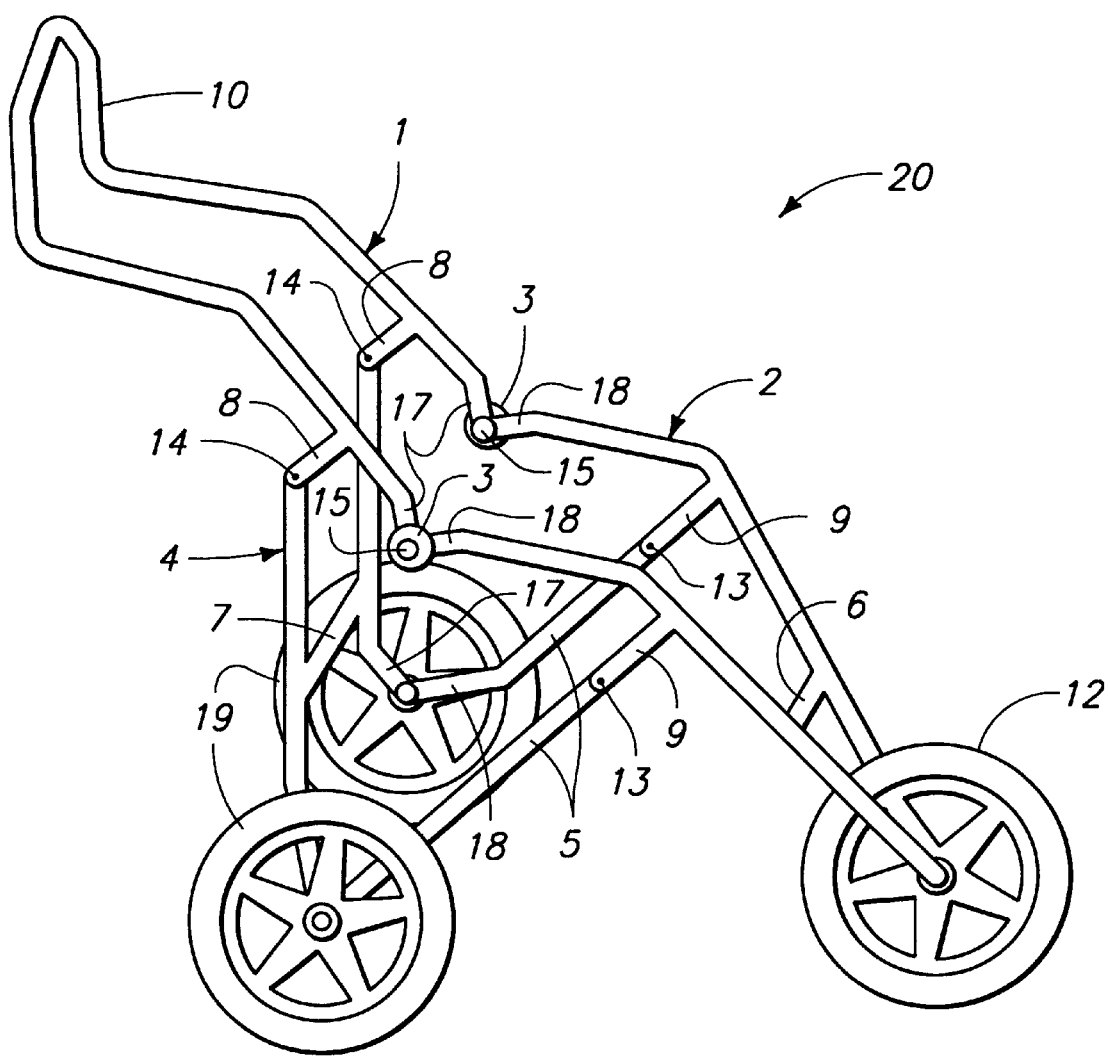
FIG. 1 shows a 3-dimensional view of the framework for the present invention without a seat rest in position.

1) Backrest/handle
2) seat-rest/front wheel fork
3) locking central pivot hinge
4) backrest to rear wheel support
5) seat-rest to rear wheel support
6) footrest cross-support
7) backrest cross-support
8) backrest pivot point extender
9) seat-rest pivot-point extender
10) upwardly arched handle
12) front wheel
13) seat-rest pivot point
14) backrest pivot point
15) central pivot point
17) anti-pinch backrest pivot bend
18) anti-pinch seat-rest pivot bend
19) rear wheels
20) seat

Figure 2:
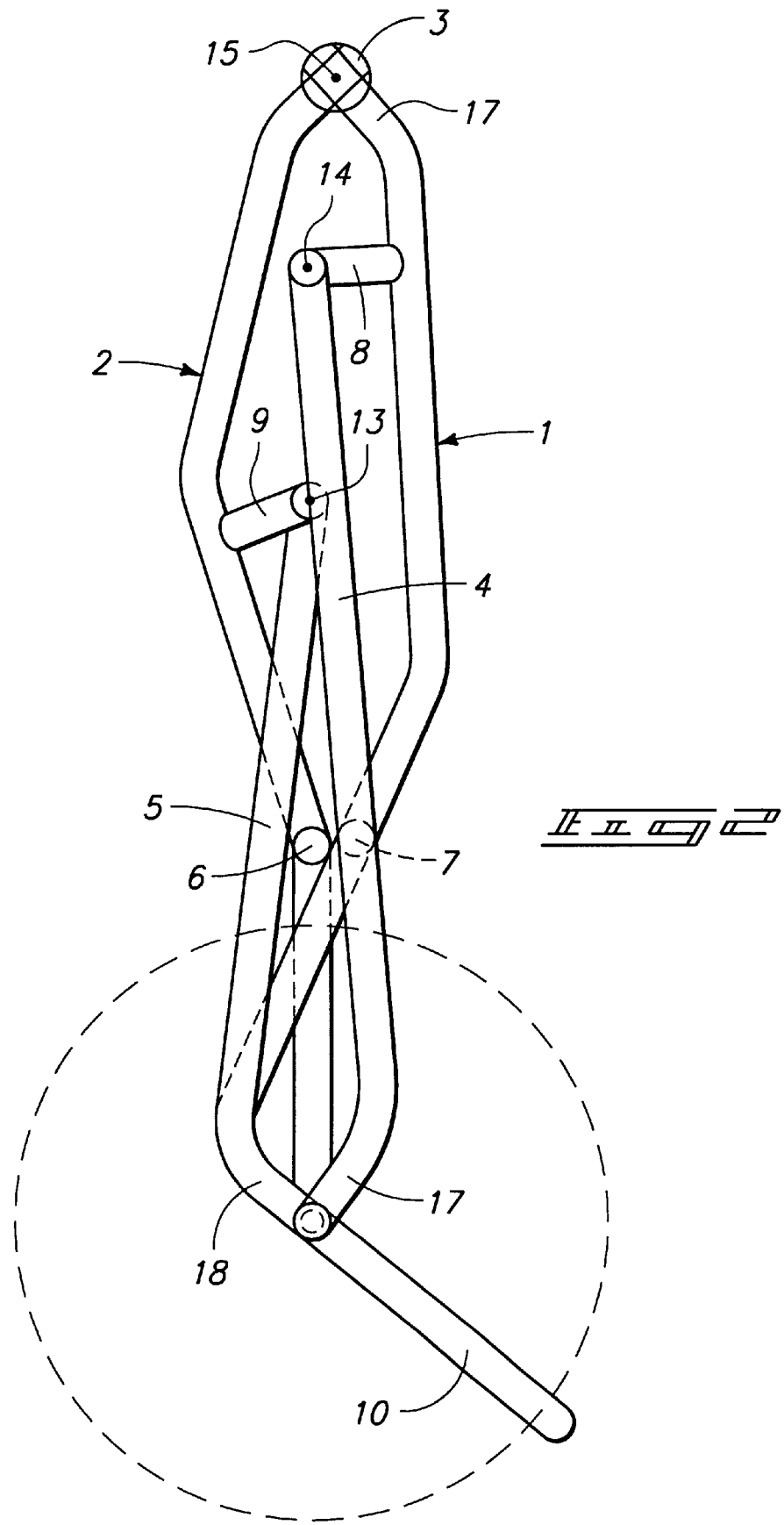
FIG. 2 shows a left side view of the collapsed stroller with the wheels thereof shown by dashed lines.
Figure 3:
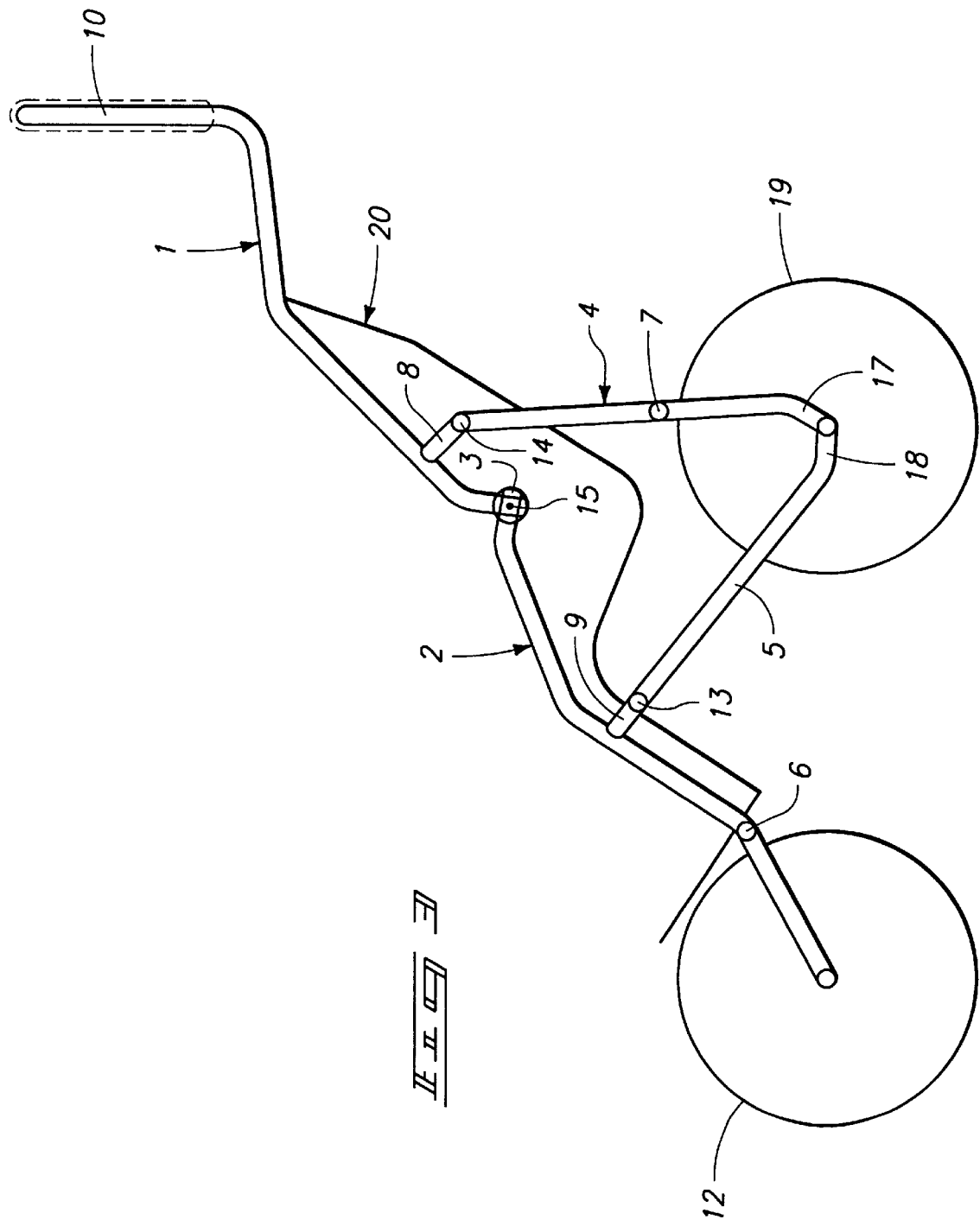
FIG. 3 shows a left side view of the present invention with a seat rest in position.
Figure 4:
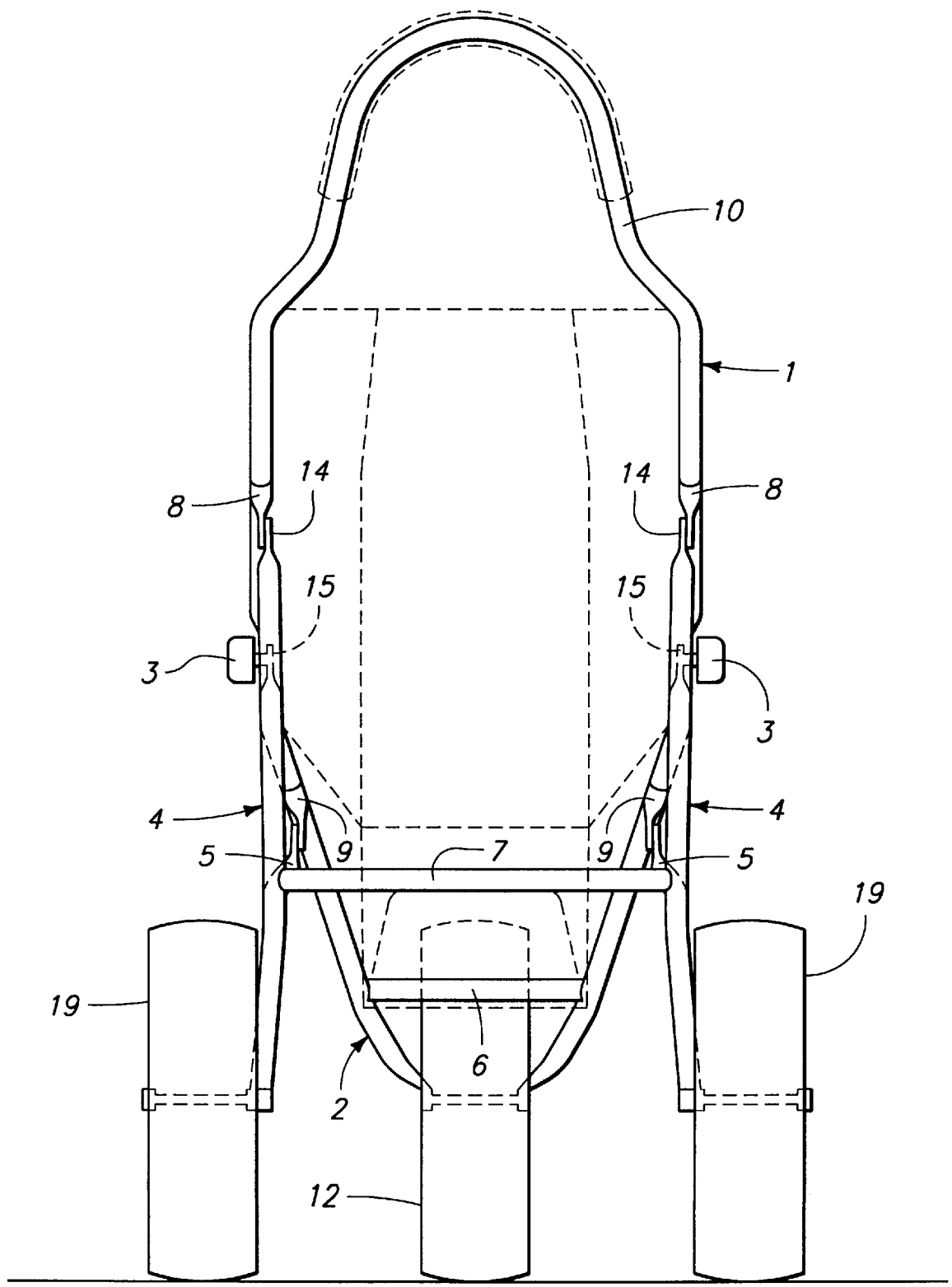
FIG. 4 shows a rear view of the present invention with the seat rest shown by dashed lines.
Figure 5:
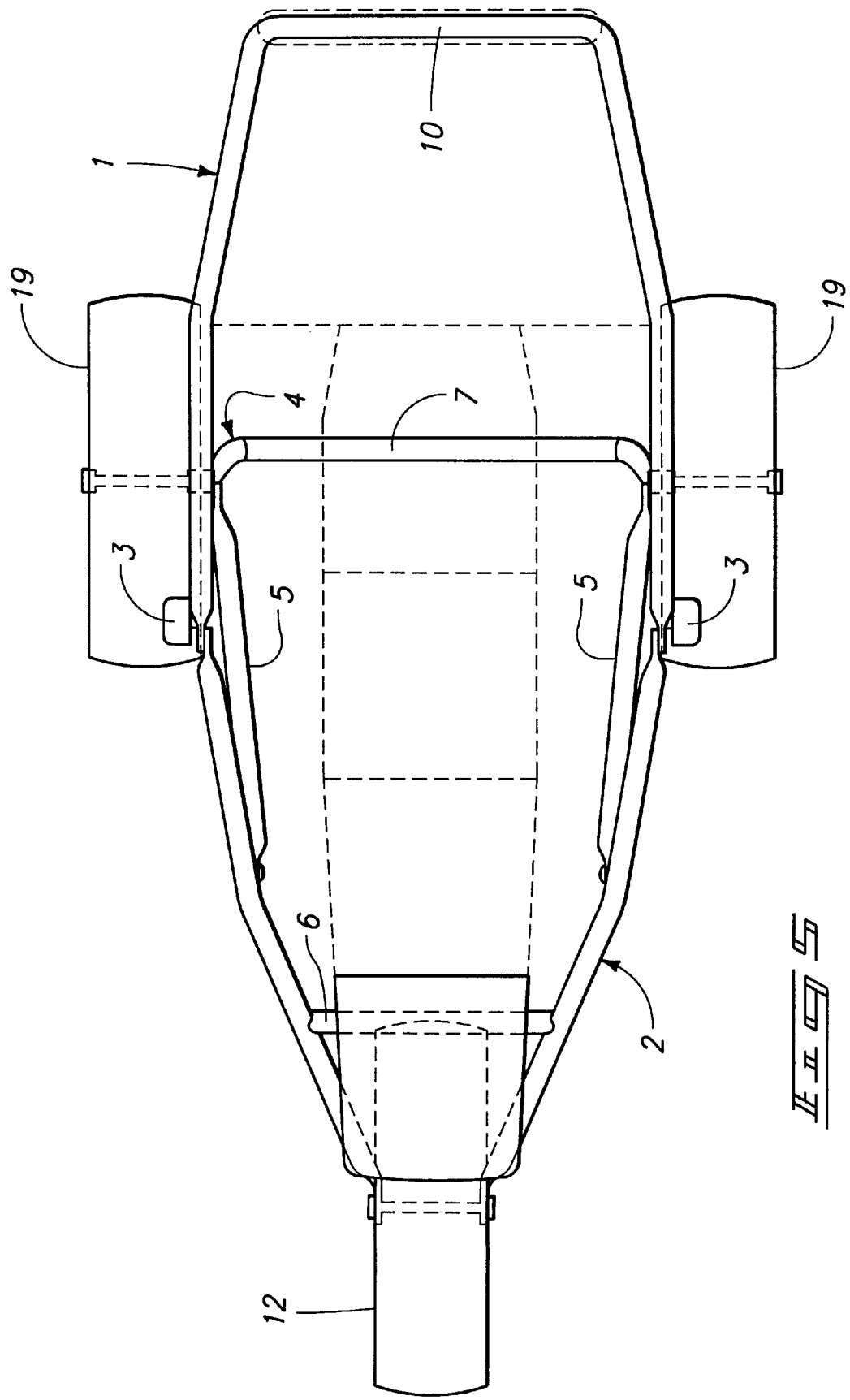
FIG. 5 shows a top view of the present invention, also showing the seat rest by dashed lines.

DETAILED DESCRIPTION OF PREFERRED EMBODIMENTS:

FIGS. 1, 3, 4, and 5 show a preferred embodiment of the present invention in which a rearward frame portion includes a combination handle/backrest 1, connected to a forward frame portion comprised of a combination front wheel fork/seat-rest 2 by way of locking central hinges 3. By releasing the locking pressure on the central hinges 3, an upwardly-arched handle end 10 of backrest 1 may be folded downward toward rear-wheel supports 4, while combination front wheel fork/seat-rest supports 2 pivot upward about a central pivot point 15, causing front wheel 12 to roll backwards between left and right rear wheels 19 beneath backrest cross-support 7, while the arched handle 10 folds down to nest around front wheel 12 bringing all three wheels into alignment along a single axis (FIG. 2), with all main frame members (1, 2, 4, and 5) folding toward one another until collapsed along generally single or closely aligned parallel planes, as illustrated by the side view in FIG. 2, with upwardly-arched handle end 10 nestled around front wheel 12 beneath backrest cross-support 7.

A higher ground clearance yet lowered center of gravity, provided by the improved chassis design, gains the advantage of allowing a smaller wheel size that is still large enough to mitigate the resistance of irregular ground. This uniquely raised wheel clearance allows 12" rear wheels, for example, to achieve the equivalent ground clearance of 26" rear wheels with a solid axle. Additionally, the lack of a rigid axle or framing member between the two rear wheels allows the front wheel, in collapsed mode, to align along the axis of the two rear wheels.

The major framing and support members in this vehicle define a set of four pivotally connected intersecting planes, generally defined by the lateral symmetry of four key structural members: a) a rearward frame which includes the back rest/handle 1; b) a forward frame which includes the seat rest/front wheel fork 2; c) seat rest to rear wheel supports 5; and d) back rest to rear wheel support 4, which collapse toward one another from the central pressure locking pivot point 15.

The pivotally connected intersecting planes are structurally defined as: a) the back rest/handle plane (part #1 FIG. 2), b) the seat-rest/front 5 wheel fork plane (part #2 FIG. 2), c) the back rest to rear wheel support plane (part #4 FIG. 2) which pivots at back rest pivot point 14, and d) the seat rest to rear wheel support plane (part #5) which pivots at a seat rest pivot point 13. When collapsed from the hand-operated locking and unlocking central pivot point 15, and the pivot points 13 and 14, all of the above-defined components collapse and align along generally compact parallel planes.

In the preferred embodiment of the present invention, all pivot points, including the central locking pivot point 15, the seat rest pivot point 13 and the back rest pivot point 14, are each cantilevered out of plane with at least one of any two intersecting support members, or the plane that they structurally define, eliminating all pinching/scissoring action at all pivot points. To accomplish this, backrest pivot point extenders 8 are provided on the backrest/handle 1. Similar seat-rest extenders 9 are provided on the seat-rest/front wheel fork 2. Further, anti-pinch pivot bends 17, 18 are provided at ends of the backrest/handle 1 and seat-rest/front wheel fork 2.

The two central locking pivot-hinges 3 which rotate on pivot point 15 and lock in 180° opposed positions, provide these unique advantages: 1) The collapsing action, rather than occurring downward from the central pivot 15, in the direction of gravity and thus the direction of a child's weight, occurs in an upward direction—against the child's weight and against the direction of gravity—minimizing the possibility of accidental collapse. And 2) the central locking pivot-hinges if cantilevered out of plane with the two primary intersecting structural planes generally defined by 1) the plane of the back-rest/handle 1 and 2) the plane of the seat-rest/front fork 2, so that no scissoring or pinching action occurs at this hand operated (and therefore more pinch-prone) locking and unlocking pivot point.

Additionally, all wheel support members attached to the two above-mentioned primary intersecting planes collapse toward one another from cantilevered pivot points, eliminating all pinching/scissoring action due to converging support members when collapsing the stroller.

Several more advantages are achieved by an upwardly arched handle that allows the stroller to be gripped and steered at variable heights without any moving parts, so people of varying size can comfortably grip and steer the stroller.

Further, the arched handle, folding downward, ends up collapsed around the central wheel 12 (within the space provided by the raised wheel clearance). It also functions as a fourth contact point with the ground, in collapsed mode (FIG. 2), allowing the folded stroller to free stand in a generally vertical posture. This allows the stroller to take up minimal floor space during transport or storage. It also allows easy transport while the stroller is collapsed because it will still roll while being pushed or pulled by hand.

In the preferred embodiment of the present invention, a cloth or nylon-like fabric seat 20 is variously snapped or otherwise fastened to the framing members described herein, forming a flexible collapsible weight-bearing sling in which the seated child is held.

While the description above contains many specifications, these should not be construed as limitations on the scope of the invention, but rather as an exemplification of the initially preferred embodiment thereof. Many other variations are possible.

For example, a stroller with four or more wheels (not shown) could be made based on the same basic folding chassis design, with two or more forward wheels that fold back into alignment with the rear wheels. Or, an optional attachment to the front fork (also not shown) could extend the forward axis laterally to the right and left, for additional forward lateral stability. The three wheel version herein simply represents the preferred embodiment of numerous potential versions that are claimed within the scope of the present invention.

For instance, in another embodiment of the present invention, the seat 20 could be formed of rigidly molded plastic or other solid seat may be removably mounted within the framework provided by the above described folding chassis, to function interchangeably as a carseat.

Other related modifications, adapting this basic design for use by disabled persons, are also well within the scope of the present invention.

Accordingly, the scope of the invention should be determined not by the embodiments illustrated, but by the appended claims and their legal equivalents.

I claim:

1. An urban and all-terrain stroller, comprising:

a rearward frame portion including a back rest;

a forward frame portion including a front wheel fork;

a front wheel mounted to the front wheel fork;

a central hinge joining the back rest and front wheel fork for selective pivotal motion about a central hinge axis;

a pair of rear wheels;

a rear wheel support mounting the rear wheels to the back rest; and wherein the central hinge is positioned to permit folding of the rear frame portion and the front frame portion together about the central hinge axis to a position in which the front wheel and rear wheels are substantially coaxial.

2. An urban and all-terrain stroller, comprising:

a rearward frame portion;

a pair of rear wheels;

a rear wheel support mounting the rear wheels to the rearward frame portion for selective pivotal movement about a backrest pivot point;

a forward frame portion;

at least one front wheel;

a front wheel fork mounting at least one front wheel to the forward frame portion for selective pivotal movement about a seat-rest pivot point;

a central hinge joining the rearward frame portion and the forward frame portion for selective pivotal motion about a central hinge axis; and anti-pinching bends and pivot point extenders on the forward and rearward frame portions, offsetting the backrest pivot point, the seat rest pivot point and the central hinge axis from the frame portions to eliminate scissoring and pinching actions between the forward frame portion, the rearward frame portion, and the front wheel fork.

* * * * *